United States Patent [19]
Moncur et al.

[11] Patent Number: 6,001,923
[45] Date of Patent: *Dec. 14, 1999

[54] TRANSPARENT FLUORINATED POLYURETHANE COATING COMPOSITIONS AND METHODS OF USE THEREOF

[75] Inventors: Marlowe V. Moncur, Irvine; Lin H. Hoo, Torrance, both of Calif.; E. John Houghton, Wilmcote, United Kingdom

[73] Assignee: Pilkington Aerospace Inc., Garden Grove, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,970

[22] Filed: Mar. 27, 1997

[51] Int. Cl.$^6$ ................................................ C08C 75/00
[52] U.S. Cl. ........................ 524/590; 528/49; 528/70; 528/76; 528/80; 528/85
[58] Field of Search ............................. 524/590; 528/49, 528/70, 76, 80, 85

[56] References Cited

U.S. PATENT DOCUMENTS

| 4,477,643 | 10/1984 | Keller . |
| 5,543,200 | 8/1996 | Hargis et al. ........................ 428/122 |

FOREIGN PATENT DOCUMENTS

| 0 192 190 | 8/1986 | European Pat. Off. ........ C08G 18/38 |
| 0 359 272 | 3/1990 | European Pat. Off. ........ C08G 18/50 |
| 0 359 273 | 3/1990 | European Pat. Off. ........ C08G 18/50 |
| 0 525 795 A2 | 2/1993 | European Pat. Off. ........ C08G 18/50 |
| 0 548 745 A2 | 6/1993 | European Pat. Off. ........ C08G 18/50 |
| 0548745 | 6/1993 | European Pat. Off. . |

*Primary Examiner*—Edward J. Cain
*Attorney, Agent, or Firm*—Sheppard, Mullin, Richter & Hampton LLP; James R. Brueggemann

[57] ABSTRACT

In accordance with the present invention, there are provided coating compositions for preparing crosslinked fluorinated polyurethane coatings and liners that exhibit high optical clarity and transparency, as well as resilience against adverse environmental effects. The present invention also provides methods for coating solid substrates with transparent, environmentally-resistant crosslinked, fluorinated polyurethane coatings, as well as the resulting coated articles.

55 Claims, No Drawings

TRANSPARENT FLUORINATED POLYURETHANE COATING COMPOSITIONS AND METHODS OF USE THEREOF

FIELD OF THE INVENTION

The present invention relates to coating compositions that, when cured, form crosslinked, fluorinated, polyurethane coatings that are weather- and chemical-resistant, hydrophobic, as well as transparent, in addition to methods for coating solid substrates with these coating compositions and to articles having transparent, weather- and chemical-resistant, hydrophobic coatings thereon.

BACKGROUND OF THE INVENTION

Aircraft and military ground vehicles are often required to operate under harsh environmental conditions. After prolonged exposure to such conditions, the windows of these vehicles, whether made from glass or plastic, tend to become scratched and pitted due to abrasion and the erosive effects of rain, hail, sand, dust, and the like. Plastic surfaces are also susceptible to damage from exposure to chemicals. As a result, visibility through these exposed surfaces becomes substantially impaired over time. To mitigate against the adverse effects of severe operating conditions, efforts have been made to devise effective protective coatings for various types of exposed surfaces. Unfortunately, these efforts have been met with limited success.

Tough, thermoset polyurethane coatings and films, sometimes referred to as "liners" exemplify one type of transparent coating system that have been used to protect glass and plastic surfaces from particle erosion and abrasion. Although effective at reducing damage caused by abrasion and erosion, they frequently are not sufficiently durable to resist the effects of weathering (i.e., long-term exposure to outdoor environmental conditions) or exposure to chemicals. Long-term outdoor exposure not only causes yellowing of the polyurethane material, but also promotes its degradation with respect to both transparency and mechanical durability. Conventional polyurethane coatings are also damaged by some organic chemicals and by strong acids, resulting in degraded vision quality.

A further drawback of using polyurethane as a protective coating material is that polyurethane surfaces are more difficult to clean, as compared to glass or conventional transparent plastic surfaces. This problem worsens with prolonged exposure to the environment. Specifically, as polyurethane surfaces weather, they become tacky. Dirt thus adheres to these tacky surfaces making cleaning increasingly difficult, causing further degradation of window vision quality. These limitations have thus far precluded the use of polyurethane coatings on transport aircraft windows.

Accordingly, a need exists for protective coatings that are both environmentally-resistant and transparent.

BRIEF DESCRIPTION OF THE INVENTION

In accordance with the present invention, we have developed coating compositions for improving the environmental durability of a substrate and methods for coating such substrates by application of a coating composition which, upon curing, forms a tough, crosslinked, fluorinated polyurethane coating that is highly weather- and chemical-resistant, hydrophobic, as well as transparent. In accordance with another aspect of the present invention, we have developed articles having transparent, yet, highly weather- and chemical-resistant, hydrophobic coatings thereon. Coating compositions of the present invention are useful in applications where optical clarity and resilience to environmental effects are highly desirable, such as, for example, as protective coatings for aircraft transparencies, or for windows of automobiles and other ground vehicles.

DETAILED DESCRIPTION OF THE INVENTION

In accordance with the present invention, there is provided a coating composition comprising:

(A) an aliphatic polyisocyanate;

(B) a non-fluorinated polyol; and (C) an aliphatic fluorinated hydroxy-functional compound selected from the group consisting of a fluorinated alcohol, a fluorinated polyol, and mixtures thereof, wherein upon application to a substrate and subsequent curing, said coating composition forms a transparent, crosslinked, fluorinated polyurethane coating having a glass transition temperature of at least about −30° C.

Aliphatic polyisocyanates contemplated for use in the practice of the present invention include, for example, linear, branched, and cyclic aliphatic compounds containing two or more isocyanate groups, as well as combinations of any two or more thereof. Exemplary aliphatic polyisocyanates include, for example, 4,4'-methylene-bis-(cyclohexyl isocyanate), 1,4-cyclohexane diisocyanate, 1,3-cyclohexane diisocyanate, 1,4-butane diisocyanate, 1,6-hexane diisocyanate, 1,10-decane diisocyanate, 2,2,4-trimethyl-1,6-hexane diisocyanate, bis-(3-methyl-4-isocyanatocyclohexyl)methane, 2,2-bis-(4-isocyanatocyclohexyl)propane, 3-isocyanatomethyl-3,5,5-trimethylcyclohexylisocyanate, 4,4'-dicyclohexyl diisocyanate, 2,4'-dicyclohexyl diisocyanate, and the like, as well as combinations of any two or more thereof. Cycloaliphatic diisocyanates are preferred and 4,4'-methylene-bis- (cyclohexyl isocyanate) is especially preferred.

The quantity of polyisocyanate in invention coating compositions can vary widely in relation to the quantities of the other composition components. Typically, the quantity of polyisocyanate is such that the ratio of —NCO— groups to total —OH groups in the invention coating composition is between about 1.5: 1 and about 1: 1. Preferably the ratio of —NCO— groups to total —OH groups in compositions of the present invention is between about 1.1: 1 and about 1: 1.

The quantity of aliphatic polyisocyanate employed in coating compositions of the present invention is typically within the range of about 10 and about 60 percent by weight, based on total coating composition weight. Preferably, the quantity of aliphatic polyisocyanate is within the range of about 25 and about 50 percent by weight, based on total coating composition weight. Most preferably, aliphatic polyisocyanate is employed in invention coating compositions in quantities within the range of about 35 and about 40 percent by weight, based on total coating composition weight.

As used herein, the term "non-fluorinated polyol" refers to a non-fluorinated monomeric or polymeric organic compound having a hydroxyl functionality of two or more (e.g., diols, triols, and compounds having a hydroxyl functionality of four or more), and mixtures thereof. As used herein, the term "monomeric" refers to an organic compound of relatively low molecular weight. The term "polymeric," as used herein, refers to an organic compound containing repeating monomeric units and having a molecular weight of 300 or greater.

Suitable non-fluorinated monomeric polyols include compounds, such as, for example, ethylene glycol, 1,3-propanediol, 1,4-butanediol, 1,5-pentanediol, 1,6-hexanediol, 1,12-decanediol, 2,2-dimethyl-propane-1,3-diol, 1,4-cyclohexane-dimethylol, trimethylolpropane, and the like, as well as combinations of any two or more thereof.

Exemplary non-fluorinated polymeric polyols include polyether polyols, polyester polyols, polycarbonate polyols, and the like, as well as combinations of any two or more thereof. Non-fluorinated polyether polyols that are suitable for use in the practice of the present invention include, for example, poly(ethylene oxide) polyols, poly(1,2-propylene oxide) polyols, poly(tetramethylene oxide) polyols, and the like, as well as combinations of any two or more thereof.

Polyester polyols contemplated for use in the practice of the present invention include, for example, polycaprolactone polyols, esterification products of low molecular weight diacids (such as, for example, adipic acid, succinic acid, palmitic acid, azelaic acid, sebacic acid, and the like, as well as combinations of any two or more thereof) and diols (such as, for example, ethylene glycol, propane-1,3-diol, butane-1,4-diol, hexane-1,6-diol, 1,6-cyclohexane diol, and the like, as well as combinations of any two or more thereof), and the like, and mixtures thereof.

Exemplary polycaprolactone polyols contemplated for use in the practice of the present invention include polyols having general formulas (I) and (II):

(I) $H-(O-(CH_2)_n-(OC))_m\ O-R_1-O\ ((CO)\ (CH_2)_n-O)_p-H$; and (II) $R_2-[O(\ (CO)\ (CH_2)_n-O)_m-H]_3$ where $R_1$ is selected from an optionally substituted, branched or straight chain, alkyl, alkenyl or alkynyl, divalent radical, having from about 1 to about 20 carbon atoms in the backbone, $R_2$ is selected from an optionally substituted, branched or straight chain, alkyl, alkenyl or alkynyl, trivalent radical, having from about 1 to about 20 carbon atoms in the backbone, and n, m, and p are integers selected such that the molecular weight of compounds embraced by (I) and (II) is between about 300 and about 10,000 g/mole. Preferably n, m, and p are selected such that the molecular weight of compounds embraced by (I) and (II) is between about 300 and about 5,000 g/mole and most preferably between about 500 and about 2,000 g/mole.

As used herein, the terms "molecular weight" and "average molecular weight" are used interchangeably to refer to the average molecular weight of a component.

Suitable polycarbonate polyols contemplated for use in the practice of the present invention include polyols having the general formula (III):

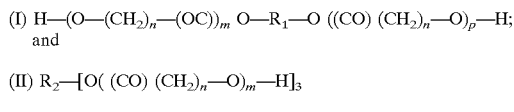

(III) $[HO-(R_3-O-(CO)-O-)_n]_m-R_4$ where $R_3$ is independently selected from an optionally substituted branched or straight chain, alkyl, alkenyl or alkynyl divalent radical, having from about 1 to about 20 carbon atoms in the backbone, $R_4$ is selected from an optionally substituted branched or straight chain, alkyl, alkenyl or alkynyl divalent or trivalent radical, having from about 1 to about 20 carbon atoms in the backbone, m is an integer selected from 2 or 3, and n is selected such that the molecular weight of compounds embraced by (III) is between about 300 and about 10,000 g/mole, preferably between about 300 and about 5,000 g/mole, and most preferably between about 300 and about 2,000 g/mole.

The polyols embraced by formulas (I), (II), and (III) that are preferred for use in the practice of the present invention include, for example, products sold under the names, Tone 200® and Tone 210® (formula (I)) (Union Carbide Corp., Specialty Polymers and Composites Div., Danbury, Conn.); Tone 301® and Tone 305® (formula (II)) (Union Carbide Corp., Specialty Polymers and Composites Div., Danbury, Conn.); and Ravecarb® 207 (formula (III)) (Enichem Synthesis S.p.A., Milan, Italy).

Non-fluorinated polymeric polyols employed in the practice of the present invention typically have an average molecular weight in the range of about 300 to about 10,000 g/mole. Preferably, non-fluorinated polymeric polyols used in compositions of the present invention have molecular weights in the range of about 300 to about 5,000 g/mole. Most preferably, non-fluorinated polymeric polyols employed in invention compositions have molecular weights in the range of about 500 to about 2,000 g/mole.

The quantity of non-fluorinated polyol(s) will vary depending on the type of non-fluorinated polyol(s) employed. Generally, on a weight basis, the quantity of non-fluorinated polyol employed in invention compositions is greater for higher molecular weight polyols (e.g., polymeric polyols), as compared to low molecular weight polyols (e.g., monomeric polyols). Typically, the total quantity of non-fluorinated polyol employed is between about 1 and about 90 percent by weight, based on total coating composition weight. Preferably the quantity of non-fluorinated polyol used in compositions of the present invention is between about 2 and about 80 percent by weight, based on total coating composition weight, and is most preferably between about 2 and about 70 percent by weight, based on total coating composition weight.

As used herein, the term "aliphatic, fluorinated hydroxy-functional compound" refers to an aliphatic compound having one or more hydroxy-functional groups, with fluorine atoms attached to one or more carbon atoms. Suitable aliphatic, fluorinated hydroxy-functional compounds include, for example, aliphatic fluorinated alcohols, aliphatic fluorinated polyols (i.e., compounds having a hydroxyl functionality of two or more), and mixtures thereof. As contemplated in the practice of the present invention, the aliphatic, fluorinated hydroxy-functional compounds can be either monomeric (low molecular weight) or polymeric.

The degree of fluorination of the aliphatic, fluorinated hydroxy-functional compounds can vary such that both partially fluorinated and perfluorinated aliphatic hydroxy-functional compounds are suitable for use in the practice of the present invention. As used herein, the term "perfluorinated" refers to a fluorocarbon compound in which the hydrogen atoms directly attached to the carbon atom are completely replaced by fluorine atoms.

Aliphatic fluorinated hydroxy-functional compounds that are employed in the practice of the present invention can be either branched or straight chain, and typically have a molecular weight in the range of about 100 to about 20,000 g/mole. Preferably, aliphatic fluorinated hydroxy-functional compounds of the present invention have molecular weights in the range of about 150 to about 10,000 g/mole, and most preferably in the range of about 300 to about 5,000 g/mole.

Exemplary aliphatic fluorinated alcohols include fluoroalkane alcohols, fluoroether alcohols, fluoro-sulfonamide alcohols, and the like, as well as combinations of any two or more thereof. Preferred fluoroalkane alcohols include those having the general formula:

(IV) $CF_3-(CF_2)_n-CH_2CH_2-OH$ where n is a number between about 1 and about 10, and most preferably between about 3 and about 8. Fluoroalkane alcohols having formula (IV) are available from DuPont Specialty Chemicals (Wilmington, Del.) under the product names Zonyl® BA (n=6 & 8 majority; MWt=404 g/mole) and Zonyl® BAL (n=6 majority; MWt=443 g/mole).

Preferred fluoroether alcohols contemplated for use in the practice of the present invention include those having the formulas:

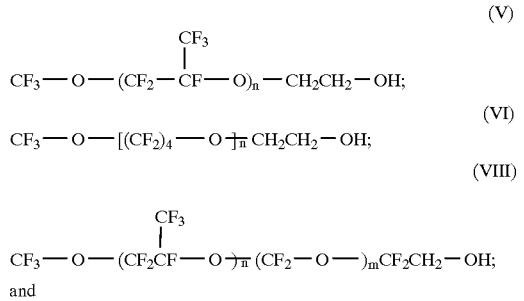

and mixtures thereof, where m and n are independently selected from numbers within the range from about 1 to about 4. An exceptional fluoroether alcohol having formula (VII) employed in the practice of the present invention is available from Ausimont S.p.A. (Milan, Italy) under the name Fomblin® MF-402 (m=3, n=1.5; MWt=712 g/mole). However, Fomblin® MF-402 is not suitable for use in invention compositions in which non-fluorinated polycaprolactone polyols of formulas (I) and (II) are also employed.

Fluoro-sulfonamide alcohols contemplated for use in the practice of the present invention include compounds having the general formula:

where $R_5$ is selected from a fluorinated, or partially fluorinated, optionally substituted, branched or straight chain, alkyl, alkenyl or alkynyl radical having from about 1 to about 20 carbon atoms in the backbone, $R_6$ is selected from an optionally fluorinated, optionally substituted, branched or straight chain, alkyl, alkenyl or alkynyl divalent radical having from about 1 to about 20 carbon atoms in the backbone, and $R_7$ is selected from a hydrogen atom, an optionally fluorinated, optionally substituted, branched or straight chain, alkyl, alkenyl or alkynyl radical having from about 1 to about 20 carbon atoms in the backbone.

An aliphatic fluoro-sulfonamide alcohol having formula (VIII) that is preferred for use in the practice of the present invention has the formula:

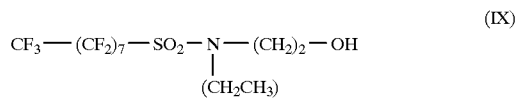

(available, for example, from 3M Corporation (St. Paul, Minn.) under the name Fluorad® FC-10).

As used herein, the term "aliphatic fluorinated polyol" refers to a fluorinated monomeric or polymeric organic compound having a hydroxyl functionality of two or more (e.g., diols, triols, and compounds having a hydroxyl functionality of four or more). Suitable aliphatic fluorinated polyols include, for example, fluoroalkane polyols, fluoro-ether polyols, fluoro-sulfonamide polyols, fluorinated vinyl alcohol polymers and copolymers thereof, and the like, as well as combinations of any two or more thereof.

Fluoroalkane polyols that are suitable for use in the practice of the present invention include, for example, polyols having the general formulas:

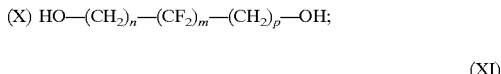

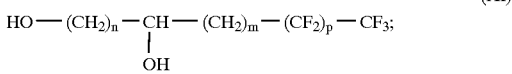

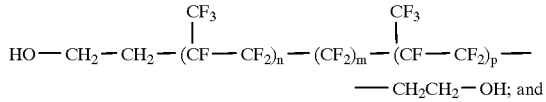

mixtures thereof, where n, m, and p are selected such that the molecular weight of compounds embraced by (X)-(XII) is between about 100 and about 3,000 g/mole. Preferably, n, m, and p are selected such that the molecular weight of compounds embraced by (X)-(XII) is between about 100 and about 2,000 g/mole, and most preferably between about 100 and about 1,000 g/mole.

Fluoroalkane polyols that are preferred for use in the practice of the present invention include compounds having the formulas, $HO-CH_2-(CF_2)_4-CH_2-OH$, $HO-CH_2-(CF_2)_3-CH_2-OH$, and $HO-CH_2-(CF_2)_2-CH_2-OH$ (i.e., formula (X)); $HO-CH_2CH(OH)-CH_2-(CF_2)_5CF_3$ (i.e., 3-perfluorohexyl-propane-1,2-diol (formula XI)); and the compound having the formula $HO-CH_2CH_2-(CF_2)_5-CF(CF_3)-CH_2-CH_2-OH$ (i.e., formula (XII)) (although this particular formula (XII) compound is not suitable for use in conjunction with non-fluorinated polyols of formulas (I) and (II)).

Fluoroether polyols contemplated for use in the practice of the present invention include fluorinated compounds having the following general formulas:

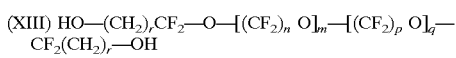

where r is 1 or 2, n, m, p, and q are selected such that the molecular weight of compounds embraced by (XIII) is between about 500 and about 5,000 g/mole, and where m/q is at least about 0.9. Most preferably, m/q is at least about 1. Preferably n, m, p, and q are selected such that the molecular weight of compounds embraced by (XIII) is between about 500 and about 3,000 g/mole, and most preferably between about 500 and about 2,000 g/mole; and

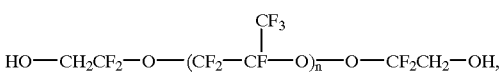

where n is selected such that the molecular weight of compounds embraced by (XIV) is between about 500 and about 5000 g/mole, preferably between about 500 and about 3,000 g/mole, and most preferably between about 500 and about 2,000 g/mole.

A fluorinated polyol of the present invention embraced by (XIII), that is preferred for use in the practice of the present invention, is the polyol having the formula, HO—$CH_2CF_2$—O—[$(CF_2)_2$ O ]$_6$—[$(CF_2)$ O)]$_6$—$CF_2$ $CH_2$—OH (available, for example, from Ausimont, S.p.A., Milan, Italy, under the name Fluorobase® Z-1030)

Typically, aliphatic fluorinated hydroxy-functional compound(s) are employed in compositions of the present invention in a quantity within the range of about 1 to about 85 percent by weight, based on total composition weight. Preferably, the quantity of aliphatic fluorinated hydroxy-functional compound(s) employed in invention compositions is within the range of about 3 to about 70 percent by weight, based on total composition weight. Most preferably, aliphatic fluorinated hydroxy-functional compounds are employed in invention compositions in a total quantity ranging from about 3 to about 60 percent by weight, based on the total composition weight.

Optionally, coating compositions of the present invention may contain additives, such as, for example, tinting agents, UV absorbing or blocking agents, anti-oxidants, anti-static agents, and the like, as well as combinations of any two or more thereof. Specific chemical compounds having the above-described functionalities can be readily identified by those of ordinary skill in the art.

Coating compositions of the present invention typically contain a curing catalyst. As used herein, the term "curing catalyst" refers to an agent that promotes polymerization. Suitable curing catalysts include derivatives of tin (e.g., dibutyl tin dilaurate, dibutyl tin diacetate, dibutyl tin oxide, and the like), iron derivatives (e.g., ferroacetylacetonate, and the like), titanium alcoholates (e.g., titanium tetraisopropylate and the like), tertiary amines (e.g., triethylamine, and the like), and the like, as well as combinations of any two or more thereof.

The actual quantity of curing catalyst can vary widely and is typically up to about 0.01 percent by weight, based on total composition weight. Preferably the quantity of curing catalyst employed in invention compositions is within the range of about 0.001 to about 0.005 percent by weight, of total composition weight.

Composition components can be mixed together without any pre-reaction step in a "one shot" process, or alternatively, one or more prepolymers can optionally be prepared from one or more of the invention composition components for subsequent mixing with the remaining comhosition components. As used herein, the term "prepolymer" refers to a reactive chemical species that is partially polymerized (i.e., a species that retains additional polymerizable functionality). Prepolymers are prepared by allowing one or more of the components of the invention composition to partially polymerize.

A "two stage" mixing process can be employed when a prepolymer is used in compositions of the present invention. Thus, for example, a prepolymer of aliphatic polyisocyanate (s) and aliphatic, fluorinated hydroxy-functional compound (s) can first be prepared, then combined with one or more non-fluorinated polyols, and optionally, additional aliphatic polyisocyanate and/or aliphatic fluorinated hydroxy-functional compound. Alternatively, a prepolymer of aliphatic polyisocyanate(s) and non-fluorinated polyol(s) can first be prepared, then combined with one or more aliphatic, fluorinated hydroxy-functional compounds, and optionally, additional aliphatic polyisocyanate and/or aliphatic non-fluorinated polyol. The prepolymer is typically prepared such that the ratio of total —NCO— groups to total —OH groups is about 1.5: 1.0 or higher.

The "two stage" process is preferred, for example, when one or more of the invention composition components is insoluble with the rest of the composition, but where a prepolymer of the insoluble component(s) is actually soluble with the other composition components. The "two stage" process is also preferred when enhanced viscosity is desired due to processing considerations.

Optionally, it is sometimes desirable to incorporate compatible solvents into the invention compositions, for example, to modify the viscosity of the coating composition in order to facilitate the coating process, to modify the kinetics of the curing process, to modify the thickness of the cured coating, and the like. As used herein, the term, "compatible solvent" refers to a solvent that does not induce substantial phase separation of composition components during the curing process, does not react with the polyisocyanate, and does not induce crazing (or any other type of damage) in the substrate material.

Compatible solvents are, thus, capable of solubilizing components of the invention composition, and in addition, are capable of swelling partially or fully cured coatings of the present invention. Those of ordinary skill in the art will appreciate that the particular solvent employed should also be compatible with the specific substrate used. For example, when acrylic and polycarbonate substrates are employed, suitable solvents include those that will not solubilize acrylic or polycarbonate, such as, for example, propylene glycol monomethyl ether acetate, 2-ethoxyethyl acetate, and the like. Preferred solvents for use when glass substrates are employed are methyl ethyl ketone, cyclohexanone, and ethyl acetate.

Solvents are not required to produce the transparent, weather-resistant coatings of the present invention. As demonstrated in the examples provided below, transparent, weather-resistant coatings can be readily prepared from invention compositions that are either solventless or substantially solventless.

In accordance with another aspect of the present invention, there is provided a method for coating a solid substrate comprising:

(i) preparing a coated substrate by contacting at least one surface of a solid substrate with a coating composition which forms a transparent, crosslinked, fluorinated polyurethane coating, said coating composition comprising:
   (A) an aliphatic polyisocyanate;
   (B) a non-fluorinated polyol; and
   (C) an aliphatic fluorinated hydroxy-functional compound as described herein; then
(ii) subjecting said coated substrate to curing conditions such that said coating composition forms a transparent, crosslinked, fluorinated polyurethane coating having a glass transition temperature of at least about —30° C.

Solid substrates suitable for use in the practice of the present invention include those made from glass and polymeric materials. Useful polymeric substrates include polycarbonates, acrylics, polyesters, cellulosics, styrene-acrylonitrile copolymers and derivatives, polyurethane plastics, and the like.

The term "contacting," as used herein, refers to the application of the coating composition to the solid substrate. Suitable methods for contacting a solid substrate with coating compositions of the present invention include dip coating, roll coating, gravure coating, flow coating, curtain coating, spray coating, and other like coating methods that are well known to those of ordinary skill in the art. Dip coating and other coating techniques that coat both sides of a substrate may also be used, or single side coating techniques may be repeated on the other side of a substrate, if desired. These various application methods allow the coating to be placed on at least one side of the substrate in a range of thicknesses, thus permitting the invention coating to be suitable for a variety of applications.

After the contacting step, the coating composition and substrate are subjected to curing conditions that are sufficient to crosslink and polymerize the coating composition such that the resulting cured coating has a glass transition temperature of at least about −30° C. As used herein, the term "curing" refers to the polymerization of composition components. The coating composition and substrate are normally heated to expedite curing of the coating composition. Temperatures in the range of about 50° C. to about 110° C., for a time period in the range of about 2 to about 48 hours, can typically be used for most polymeric substrates. Preferred curing conditions are temperatures in the range of about 60° C. to about 90° C., for a time period in the range of about 5 to about 18 hours.

Suitable curing conditions (i.e., temperature and duration) will vary depending on the reactive nature of the coating composition components and the nature of the underlying substrate. In general, curing conditions should be selected so that the selected substrate is not softened and distorted during curing. However, certain materials may be able to withstand more severe conditions. For example, if the substrate is glass, higher curing temperatures and longer curing times can be used. Also, when prepolymer-containing invention compositions are employed, shorter curing times are generally required. In general, when higher curing temperatures are used to cure coating compositions of the present invention, shorter curing times are required and vice-versa.

Optionally, a pre-curing step can be employed in between the contacting step and the curing step. Pre-curing the coated substrate produces a tack-free coated surface that can be handled for inspection or stored for later completion of the curing process. Coated substrates are pre-cured by exposing the coated substrate to lower temperatures and/or shorter times than required for a full cure. Specific pre-curing conditions (i.e., time/temperature) for a particular coating can be readily determined by those of ordinary skill in the art.

Prior to coating, surfaces of the substrate can be primed or otherwise treated to further promote adhesion and the formation of a continuous coating with the invention compositions. The primer can also be used to impart additional properties to the cured coating, such as, for example, impact resistance, light absorption, toughness, and the like. Surfaces of the solid substrate can be primed in a number of ways to alter the surface properties therein in order to promote the formation of a uniform coating. Such methods for priming coating surfaces include chemical and physical methods that are well known to those of ordinary skill in the art. For example, the substrate can be chemically or physically etched, or coated with a primer.

Alternatively, fluorinated polyurethane coatings of the present invention can be prepared as liners and sheets that are laminated to solid substrates. Thus, as used herein, the terms "liner" and "sheet" are used interchangeably with the term "coating". Liners and sheets can be prepared by methods such as liquid injection molding, casting, and other like methods that are well known to those having ordinary skill in the art. These liners and sheets can then be laminated to the solid substrate using an adhesive material, such as, for example, a thermoplastic or reactive thermoset, liquid or solid film. The adhesive material is typically a transparent polymeric material, such as, for example, a polyurethane, an epoxy, an acrylate, and the like.

Once cured, coatings of the present invention typically have a glass transition temperature (Tg) of at least about −30° C. Preferably, the glass transition temperature of the cured coating is at least about 0° C., and most preferably, at least about 10° C.

Coating compositions of the present invention typically perform best when the cured coating thickness is in the range of about 0.001 to about 0.050 inches. Preferably, the cured coating thickness is in the range of about 0.002 to about 0.030 inches. Most preferably, cured coating thicknesses are in the range of about 0.003 to about 0.020 inches.

Fluorinated polyurethane coatings of the present invention are crosslinked and typically have a molecular weight between branch points ($MW_{Branch\ Point}$) of between about 200 and about 10,000 g/mole. Preferably, cured coatings of the present invention have a $MW_{Branch\ Point}$ of between about 500 and about 5,000 g/mole, and most preferably between about 500 and about 3,000 g/mole.

The fluorine content of invention coatings can be adjusted by modifying the type and quantity of aliphatic, fluorinated hydroxy-functional compound(s) employed in coating compositions of the present invention. As used herein, the term "fluorine content" refers to the percentage, on a weight basis, of fluorine atoms relative to total cured coating weight. Fluorine content of invention coatings can be quantitatively determined utilizing methods, such as ion chromatography, as well as other like assay methods for fluorine that are well known to those having ordinary skill in the art. The fluorine content of cured coatings of the present invention is typically less that about 80% by weight. Preferably, the fluorine content of invention coatings is between about 0.1 and about 70 percent by weight, and most preferably between about 0.1 and about 60 percent by weight.

Fluorinated polyurethane coatings and liners of the present invention are remarkably transparent, thus overcoming a phenomena typically encountered with fluorinated polyurethanes, that is, the phase separation of fluorinated and non-fluorinated polyurethane precursor components into microdomains that scatter light. As used herein, the term "polyurethane precursor" refers to a reactive compound that is capable of reacting with other compounds to form polyurethane. Phase separation during polymerization typically causes the resulting fluorinated polyurethane coating or liner to be opaque. Thus, historically, fluorinated polyurethanes have not been typically well suited for use in applications where transparency and optical clarity are critical performance attributes.

In contrast, fluorinated polyurethane coatings and liners of the present invention exhibit about the same degree of transparency as non-fluorinated polyurethane coatings. At least about 80% of incident light is typically transmitted through invention fluorinated polyurethane coatings (i.e., 80% Light Transmittance ("LT")), when measured through a free-standing film or through a coating on a transparent acrylic sheet substrate. Light Transmittance is measured in accordance with ASTM D1003, which is incorporated herein by reference. Preferably, fluorinated polyurethane coatings and liners of the present invention exhibit a percent light transmittance of at least about 85%LT. Most preferably, fluorinated polyurethane coatings and liners of the present invention exhibit a percent light transmittance of at least about 90%LT.

Transparent, fluorinated polyurethane coatings of the present invention are also very durable, as demonstrated by their relatively high tensile strength, tensile elongation and hardness. For example, invention coatings typically exhibit a tensile strength of at least about 1000 psi. Preferably, transparent coatings of the present invention exhibit a tensile strength of at least about 2000 psi, and most preferably a tensile strength of at least about 3000 psi.

Transparent coatings of the present invention typically exhibit a tensile elongation of at least about 50%. Preferably, invention coatings exhibit a tensile elongation of at least about 100%, and most preferably a tensile elongation of at least about 150%.

Coatings of the present invention typically exhibit a hardness, as measured by ASTM D2240, incorporated herein by reference, of at least about Shore A80 or Shore D30. Preferably, transparent, fluorinated polyurethane coatings of the present invention exhibit a hardness in the range of at least Shore A80 and about Shore D50 to about Shore D100, and most preferably in the range of about Shore D50 to about Shore D80.

Transparent, fluorinated polyurethane coatings of the present invention typically exhibit a tear strength of at least about 100 piw (pounds per inch width). Preferably, cured transparent coatings of the present invention exhibit a tear strength of at least about 200 piw, and most preferably, at least about 300 piw. Tear strength can be measured in accordance with ASTM D-624, which is incorporated herein by reference.

Significantly, cured coatings and liners of the present invention are not only transparent and mechanically durable, but also exhibit improved stability to weathering effects as compared to non-fluorinated polyurethene coatings. For example, surface pitting, haze, tack and yellowing, typically caused by molecular weight degradation, are reduced in weathered fluorinated polyurethane coatings and liners of the present invention, as compared to weathered non-fluorinated polyurethane coatings.

Additionally, as compared to non-fluorinated polyurethane coatings, fluorinated polyurethane coating surfaces of the present invention are stain-resistant and easy to clean, exhibit higher water contact angles (which results in a higher degree of water repellency and diminished ice adhesion), as well as superior chemical resistance to organic solvents and corrosive materials, such as, for example, acidic and basic materials.

In yet another embodiment of the present invention, there are provided articles that are prepared in accordance with the methods of the present invention. The articles generally are solid transparent substrates or composites having a highly environmentally-resistant, transparent, crosslinked, fluorinated polyurethane coating or liner of the present invention thereon.

The invention will now be described in greater detail with reference to the following non-limiting examples.

EXAMPLE 1

Preparation of a Non-Fluorinated Polyurethane Reference Polymer Coating (Composition No. 1)

A non-fluorinated polyurethane reference coating was prepared by combining a non-fluorinated prepolymer of polyol and isocyanate, i.e., "Prepolymer 1", and a polyol mix, i.e., "Polyol 1". Prepolymer 1 was made according to the following composition:

| Composition: Prepolymer 1 | Weight % |
|---|---|
| 4,4'-methylene-bis-(cyclohexyl isocyanate) (Desmodur ® W, Bayer, Pittsburg, PA) | 79.3 |
| Polycaprolactone diol, | 20.6 |
| (H—(O—(CH$_2$)$_5$—(OC))$_m$—O—R—O— —((CO)(CH$_2$)$_5$—O)$_m$—H; MW = 830 g/mole, —OH number = 135) (Tone ® 210, Union Carbide Corp., Danbury, CT) | |
| Dibutyl tin dilaurate (8% in 4,4'-methylene-bis-(cyclohexyl isocyanate)) | 0.01 |
| | 100.0 |

Prepolymer 1 was prepared by combining 4,4'-methylene-bis-(cyclohexyl isocyanate), polycaprolactone diol, and dibutyl tin dilaurate, then heating to 195° F. for 2 hours, with stirring, under a nitrogen atmosphere. Polyol 1 was prepared by combining Tone diol and triol, 1,4-butanediol, UV stabilizer, and antioxidant, in accordance with the composition below, then heating the mixture to 175° F. for 2 hours with stirring.

| Composition: Polyol 1 | Weight % |
|---|---|
| Polycaprolactone triol (R—[O((CO)(CH$_2$)$_5$O)$_m$—H]$_3$; MW = 540 g/mole, —OH number = 310) (Tone ®-305, Union Carbide Corp.) | 84.1 |
| Polycaprolactone diol (H—(O—(CH$_2$)$_5$—(OC))$_m$—O—R—O— —((CO)(CH$_2$)$_5$—O)$_m$—H); MW = 830 g/mole, —OH number = 135) (Tone ®-210, Union Carbide Corp.) | 13.2 |
| 1,4-Butanediol | 0.7 |
| UV stabilizer (Tinuvin ® 328, Ciba Geigy AG) | 1.0 |
| Antioxidant (Irganox ® 1076, Ciba Geigy AG) | 1.0 |
| | 100.0 |

A non-fluorinated polyurethane reference coating was prepared by mixing Prepolymer 1, Polyol 1, and the dibutyl tin dilaurate (in 4,4'-methylene-bis-(cyclohexyl isocyanate) in the quantities set forth below, under vacuum at 105° F. for 10 minutes, then casting the resulting solution onto a glass plate. After casting, the solution was cured at 180° F. for 24 hours with one surface of the cast solution exposed to air. The resulting transparent cured polyurethane sheet was about 0.125 inches thick.

| Composition No. 1: Non-Fluorinated Polyurethane Reference | Weight (g) |
|---|---|
| Prepolymer 1 | 1000 |
| Polyol 1 | 1030 |
| Dibutyl tin dilaurate (8% in 4,4'-methylene-bis-(cyclohexyl isocyanate)) | 0.74 |
| | 2030.74 |

This polyurethane sheet was characterized with respect to properties such as percent light transmission (%LT), percent haze (%Hz), contact angle, hardness (Shore A or Shore D), tensile strength (psi), glass transition temperature (Tg), and tear strength (piw). The test methods are described in Tables I and II (Example 11).

EXAMPLE 2

Preparation of Transparent, Crosslinked Fluorinated Polyurethane Coatings From Prepolymer-Based, Fluorinated Alcohol-Based Compositions (Composition Nos. 2–4)

Fluorinated prepolymers 2–4 were prepared from the following components:

| Composition: Prepolymer 2–4 | Prepolymer Composition/Wt (%) | | |
|---|---|---|---|
| | 2 | 3 | 4 |
| Perfluoro-sulfonamide alcohol ($C_8F_{17}SO_2N(C_2H_5)(CH_2)_2OH$; MW = 571 g/mole) Fluorad ™ FC-10, 3M Co.) | 1.9 | 5.6 | 10.3 |
| 4-4'-Methylene-bis-(cyclohexyl isocyanate) (Desmodur ® W, Bayer) | 77.9 | 75.1 | 71.6 |
| Polycaprolactone diol (Tone ® 210, Union Carbide Corp.) | 20.2 | 19.3 | 18.1 |
| Dibutyl tin dilaurate (8% in 4,4'-methylene-bis-(cyclohexyl isocyanate)) | 0.01 | 0.01 | 0.01 |
| | 100.0 | 100.0 | 100.0 |

Prepolymers 2, 3 and 4 were combined with Polyol 1 in the quantities provided below, then cast and cured as described in Example 1.

| Fluorinated Polyurethane | Composition No./Weight (g) | | |
|---|---|---|---|
| Composition Nos. 2–4 | 2 | 3 | 4 |
| Prepolymer 2 | 1000 | — | — |
| Prepolymer 3 | — | 1000 | — |
| Prepolymer 4 | — | — | 1000 |
| Polyol 1 | 977 | 960 | 874 |
| Dibutyl tin dilaurate (8% in 4,4'-methylene-bis-(cyclohexyl isocyanate)) | 0.71 | 0.69 | 0.64 |
| | 1977.71 | 1960.69 | 1874.64 |

Fluorinated polyurethane sheets were prepared by mixing the prepolymer (Prepolymer 2, 3, or 4), Polyol 1, and dibutyl tin dilaurate (in 4,4'-methylene-bis-(cyclohexyl isocyanate), under vacuum at 105° F. for 10 minutes, then casting and curing each mixture, as described in Example 1.

Each of the resulting sheets was transparent. The properties of the sheets obtained from Composition Nos. 2–4 are listed in Tables I and II (Example 11).

EXAMPLE 3

Preparation of a Reference Non-Fluorinated Polyurethane Coating and a Transparent, Crosslinked Fluorinated Polyurethane Coating from a Prepolymer-Based, Fluoro-Sulfonamide Alcohol-Based Composition (Composition Nos. 5–6)

Perfluoro-sulfonamide-based compositions were prepared as described in Example 2, except different non-fluorinated polyols were employed. Prepolymers 5 and 6 were prepared from the following components:

| Composition: Prepolymer 5–6 | Prepolymer Composition/Wt (%) | |
|---|---|---|
| | 5 | 6 |
| Perfluoro-sulfonamide alcohol ($C_8F_{17}SO_2N(C_2H_5)(CH_2)_2OH$; MW = 571 g/mole) (Fluorad ™ FC-10, 3M Co.) | 0 | 4.8 |
| 4,4'-Methylene-bis-(cyclohexyl isocyanate) (Desmodur ® W, Bayer) | 80.5 | 76.9 |
| Polycaprolactone diol (R—[O—((CO)—($CH_2)_5$—O)$_m$—H]$_2$) (Tone ® 200, Union Carbide) | 19.5 | 18.3 |
| Dibutyl tin dilaurate (8% in 4,4'-methylene-bis-(cyclohexyl isocyanate)) | 0.006 | 0.006 |
| | 100.0 | 100.0 |

"Polyol 2", a polyol-based prepolymer, was prepared according to the following composition:

| Composition: Polyol 2 | Weight % |
|---|---|
| Polycaprolactone triol (R—[O((CO)($CH_2)_5O)_m$—H]$_3$; MW = 300 g/mole, —OH number = 560) (Tone ® 301, Union Carbide Corp.) | 53.4 |
| Polycaprolactone diol (H—(O—($CH_2)_5$—(OC))$_m$—O—R—O— —((CO)($CH_2)_5$—O)$_m$—H); MW = 530 g/mole, —OH number = 212) (Tone ®-200, Union Carbide Corp.) | 44.4 |
| UV stabilizer (Tinuvin ® 328, Ciba Geigy AG) | 1.1 |
| Antioxidant (Irganox ® 1076, Ciba Geigy AG) | 1.1 |
| | 100.0 |

Polyol 2 was prepared by combining the polycaprolactone diol and triol, UV stabilizer, and antioxidant, then heating the mixture to 175° F. for 2 hours with stirring.

A non-fluorinated reference polyurethane sheet and a fluorinated polyurethane sheet were prepared by combining Prepolymers 5 and 6, respectively, and Polyol 1 in the quantities described below, then casting and curing the mixtures as described in Example 1.

| Polyurethane | Composition No./Wt (g) | |
|---|---|---|
| Composition Nos. 5–6 | 5 | 6 |
| Prepolymer 5 | 1000 | — |
| Prepolymer 6 | — | 1000 |
| Polyol 2 | 732.2 | 681.1 |
| Dibutyl tin dilaurate (8% in 4,4'-methylene-bis-(cyclohexyl isocyanate)) | 0.42 | 0.39 |
| | 1732.62 | 1681.49 |

After curing, both non-fluorinated polyurethane reference coating and fluorinated polyurethane coating of the present invention appeared transparent.

Properties of the non-fluorinated reference coating and the invention fluorinated coating of this example are listed under Composition Nos. 5 and 6, in Tables I and II (Example 11).

EXAMPLE 4

Preparation of Transparent, Crosslinked Fluorinated Polyurethane Coatings from Fluoroalkane Alcohol-Based Compositions in a "One-Step Method" (i.e., non-prepolymer-based composition) (Composition Nos. 7–8)

Polyurethanes were prepared by a one-step process using the following compositions:

| Fluorinated Polyurethane | Composition No./Wt (%) | |
|---|---|---|
| Composition Nos. 7–8 | 7 | 8 |
| 1H, 1H, 2H, 2H-Perfluorodecan-1-ol | 3.0 | 3.0 |
| 4,4'-Methylene-bis-(cyclohexyl isocyanate) (Desmodur ® W, Bayer) | 41.3 | 36.8 |
| Polycaprolactone diol (Tone ® 200, Union Carbide Corp.) | 0 | 31.3 |
| Polyester triol (R—[O—((CO—(CH$_2$)$_5$—O)$_m$—H]$_3$; MW = 540 g/mole, —OH number = 310) (Tone ® 305, Union Carbide Corp.) | 55.7 | 28.9 |
| Dibutyl tin dilaurate (8% in 4,4'-methylene-bis-(cyclohexyl isocyanate)) | 0.001 | 0.001 |
| | 100.0 | 100.0 |

The above components were mixed together at 180° F., degassed under vacuum, then cast into a mold made from two glass plates with a perimeter gasket. The mold was heated at 180° F. for 24 hours to complete the curing, resulting in a 0.040 inch thick fluorinated polyurethane sheet.

Both fluorinated polyurethane sheets were transparent after curing. Properties of the fluorinated polyurethane sheets prepared from Composition Nos. 7 and 8 are listed in Tables I and II (Example 11).

EXAMPLE 5

Preparation of Transparent, Crosslinked Fluorinated Polyurethane Coatings from Fluoroalkane Polyol-Based Compositions (Composition No. 9)

A non-fluorinated reference polyurethane coating was prepared using a one-step process according to the following composition:

| Non-Fluorinated Polyurethane Reference Composition No. 9 | Composition No./Wt (%) 9 |
|---|---|
| 3-(Perfluorohexyl)-propane-1,2-diol (DHPFHP: HO—CH$_2$CH(OH)CH$_2$(CF$_2$)$_5$CF$_3$) | 0 |
| 4,4'-Methylene-bis-(cyclohexyl isocyanate) (Desmodur ® W, Bayer) | 32.0 |
| Polycarbonate Triol (HO—(R—O—(CO)—O)$_n$—R—OH) (Ravecarb ® 207, Enichem Synthesis S.p.A., Milan, Italy) | 68.0 |
| Non-Fluorinated Polyurethane Reference Composition No. 9 | Composition No./Wt (%) 9 |
| Dibutyl tin dilaurate (8% in 4,4'-methylene-bis-(cyclohexyl isocyanate)) | 0.001 |
| | 100.0 |

The above components were mixed at 180° F., degassed under vacuum, then cast into a mold made from two glass plates with a perimeter gasket. The mold was heated at 180° F. for 24 hours to complete the curing.

The resulting non-fluorinated polyurethane sheet was transparent. Properties of the cured sheet obtained from Composition No. 9 are listed in Tables I and II (Example 11).

EXAMPLE 6

Preparation of Transparent, Crosslinked Fluorinated Polyurethane Coatings from Fluoroalkane Polyol-Based Compositions (Composition Nos. 10–13)

Polyurethanes were prepared by a one-step process according to the following compositions:

| Fluorinated Polyurethane | Composition No./Wt (%) | | | |
|---|---|---|---|---|
| Composition Nos. 10–13 | 10 | 11 | 12 | 13 |
| DHPFHP | 2.5 | 4.6 | 7.1 | 9.4 |
| 4,4'-Methylene-bis-(cyclohexyl isocyanate) (Desmodur ® W, Bayer) | 32.1 | 32.4 | 32.3 | 32.2 |
| Polycarbonate triol (HO—(R—O—(CO)—O)$_n$—R—OH) (Ravecarb ® 207, Enichem) | 65.4 | 63.0 | 60.6 | 58.4 |
| Dibutyl tin dilaurate (8% in 4,4'-methylene-bis-(cyclohexyl isocyanate)) | 0.001 | 0.001 | 0.001 | 0.001 |
| | 100.0 | 100.0 | 100.0 | 100.0 |

The above components were mixed at 180° F., degassed under vacuum, then cast into a mold made from two glass plates with a perimeter gasket. The mold was heated at 180° F. for 24 hours to complete the curing.

The resulting fluorinated polyurethane sheets of the present invention were all transparent. The properties of these sheets are listed in Tables I and II (Example 11).

EXAMPLE 7

Preparation of Transparent, Crosslinked Fluorinated Polyurethane Coatings from Fluoroalkane Polyol-Based Compositions (Composition Nos. 14–17)

Fluorinated polyurethanes of the present invention were prepared as described in Example 6, except different non-fluorinated polyols were substituted into the coating composition. The compositions were as follows:

| Fluorinated Polyurethane | Composition No./Wt (%) | | | |
|---|---|---|---|---|
| Composition Nos. 14–17 | 14 | 15 | 16 | 17 |
| DHPFP | 1 | 1.5 | 2.0 | 2.5 |
| 4,4'-Methylene-bis-(cyclohexyl isocyanate) (Desmodur ® W, Bayer) | 38.8 | 38.3 | 37.8 | 37.3 |
| Polycaprolactone diol (Tone ® 200, Union Carbide Corp.) | 31.3 | 31.3 | 31.3 | 31.3 |
| Polycaprolactone triol (Tone ® 305, Union Carbide Corp.) | 28.9 | 28.9 | 28.9 | 28.9 |
| Dibutyl tin dilaurate (8% in 4,4'-methylene-bis-(cyclohexyl isocyanate)) | 0.001 | 0.001 | 0.001 | 0.001 |
| | 100.0 | 100.0 | 100.0 | 100.0 |

The above components were mixed at 180° F., degassed under vacuum, then cast into a mold made from two glass plates with a perimeter gasket. The mold was heated at 180° F. for 24 hours to complete the curing.

The resulting fluorinated polyurethane sheets of the present invention were all transparent. The properties of these sheets are listed in Tables I and II (Example 11).

EXAMPLE 8

Preparation of Transparent, Crosslinked Fluorinated Polyurethane Coatings from Prepolymer-Based, Fluoroalkane Polyol-Based Compositions (Composition Nos.18–20)

Transparent, crosslinked, fluorinated polyurethane coatings were prepared by combining a perfluoro-1,10-decanediol-based prepolymer, i.e., "Prepolymers 7," "Prepolymer 8", "Prepolymer 9", and Polyol 1. Prepolymers 7–9 were prepared according to the following compositions:

| | Prepolymer Composition No./Wt (%) | | |
|---|---|---|---|
| Composition: Prepolymer 7–9 | 7 | 8 | 9 |
| 1H, 1H, 10H, 10H-Perfluoro-1,10-decanediol (HO—CH$_2$(CF$_2$)$_8$CH$_2$OH; MW = 462 g/mole) (Aldrich, Milwaukee, WI) | 1.9 | 5.5 | 10.3 |
| 4,4'-Methylene-bis-(cyclohexyl isocyanate) (Desmodur ® W, Bayer) | 78.0 | 75.6 | 71.6 |
| Polycaprolactone diol (Tone ® 210, Union Carbide Corp.) | 20.2 | 18.9 | 18.1 |
| Dibutyl tin dilaurate (8% in 4,4'-methylene-bis-(cyclohexyl isocyanate)) | 0.01 | 0.01 | 0.01 |
| | 100.0 | 100.0 | 100.0 |

Fluorinated Prepolymers 7–9 were prepared by combining all of the above components with stirring for 2 hours at 195° F. under a nitrogen atmosphere. Prepolymers 7–9 were then combined with Polyol 1 in the quantities provided below, then cast and cured as described in Example 1.

| Fluorinated Polyurethane | Composition No./Weight (g) | | |
|---|---|---|---|
| Compositions Nos. 18–20 | 18 | 19 | 20 |
| Prepolymer 7 | 50.00 | — | — |
| Prepolymer 8 | — | 51.45 | — |
| Prepolymer 9 | — | — | 53.46 |
| Polyol 1 | 49.96 | 48.52 | 46.51 |
| Dibutyl tin dilaurate (8% in 4,4'-methylene-bis-(cyclohexyl isocyanate)) | 0.036 | 0.035 | 0.034 |
| | 100.0 | 100.0 | 100.0 |

Each of the resulting invention fluorinated coatings was transparent. The properties of the coatings obtained from composition Nos. 18–20 are listed in Tables I and II (Example 11).

EXAMPLE 9

Preparation of Transparent, Crosslinked Fluorinated Polyurethane Coatings from a Prepolymer-Based, Fluoroether Polyol-Based Composition (Composition Nos. 21 & 25)

A transparent, crosslinked, fluorinated polyurethane coating was prepared from a perfluoroether polyol-based prepolymer, i.e., "Prepolymer 10", according to the following composition:

| Composition: Prepolymer 10 | Weight % |
|---|---|
| Perfluoroether polyol (HO—CH$_2$CF$_2$—O—[(CF$_2$)$_2$—O]$_6$—(CF$_2$O)$_6$—CF$_2$CH$_2$OH; MW = 935 g/mole, —OH number = 120) (Fluorobase ® Z-1030, Ausimont, S.p.A.) | 64.1 |
| 4,4'-Methylene-bis-(cyclohexyl isocyanate) (Desmodur W, Bayer) | 35.9 |

Prepolymer 10 was prepared by mixing the perfluoroether polyol and isocyanate under nitrogen at 195° F. The dibutyl tin dilaurate was then gradually added to the mixture, with stirring, over a 1.5 hour period. The prepolymer solution was stirred and heated for one additional hour at 195–205° F.

| Transparent, crosslinked, fluorinated polyurethane liners were prepared according to the following compositions: | | | | | |
|---|---|---|---|---|---|
| Fluorinated Polyurethane | Composition No./Weight (%) | | | | |
| Composition Nos. 21–25 | 21 | 22 | 23 | 24 | 25 |
| Prepolymer 10 | 77.9 | 77.6 | 75.89 | 73.35 | 70.86 |
| Perfluoroether polyol (Fluorobase ® Z-1030, Ausimont, S.p.A.) | 20.2 | 17.9 | 20.11 | 23.32 | 26.49 |
| Trimethylol propane (CH$_3$CH$_2$C—(CH$_2$OH)$_3$) (Hoechst Celanese, Somerville, NJ) | 1.9 | 4.5 | 4 | 3.33 | 2.65 |
| | 100.0 | 100.0 | 100.0 | 100.0 | 100.0 |

For each composition, the perfluoroether polyol and trimethylol propane were combined and heated at 212° F. under vacuum for 1.5 hours. Prepolymer 10 was heated in a separate container at 212° F., also under vacuum for 1.5 hours. All of the components were combined together, stirred, then heated at 212° F. under vacuum for 5 minutes. The solution was cast in a mold made from two glass plates and a perimeter gasket, then cured at 275° F. for 8 hours. The resulting transparent, fluorinated polyurethane sheets were each about 0.040 inches thick. The properties of these sheets are listed in Tables I and II (Example 11).

EXAMPLE 10

Test Methods

I. Fluorine Content

Fluorine content was calculated according to the following formula:

$$\left(\frac{19 \times \text{No. of fluorine atoms}}{\text{Mol. Wt. of fluorinated polyol}}\right) \times (\% \text{ fluorinated polyol in polyurethane})$$

II. Molecular Weight Between Branch Points

Molecular weight between branch points was computed according to the following formula:

$$\frac{2 \times \text{Total Weight polyurethane}}{\text{Total equivalents of triols.}}$$

III. Optical Clarity (Transmittance)

Percent light transmittance was determined according to standard test method ASTM D-1003, incorporated herein by reference.

IV. Coating Hardness

Hardness was determined according to standard test method ASTM D-2240, incorporated herein by reference.

V. Tensile Strength and Tensile Elongation

Tensile strength and tensile elongation were determined in accordance with standard test method ASTM D-638, incorporated herein by reference.

VI. Water Contact Angle

Water contact angles for the cured invention coatings and liners were determined in accordance with standard test method ASTM D-724, incorporated herein by reference.

VII. Glass Transition Temperature (Tg)

Glass transition temperatures for the cured invention coatings and liners were determined in accordance with standard test method ASTM D-5026, incorporated herein by reference.

VIII. Tear Strength

Tear strengths for the cured invention coatings and liners were determined in accordance with standard test method ASTM D-624, incorporated herein by reference.

EXAMPLE 11

Characterization of Invention Fluorinated Polyurethane Coatings

The polyurethane coatings described in Examples 1–10 were characterized with respect to attributes such as %Light Transmittance, %haze, hardness, tensile strength, tensile elongation, tear strength, and water contact angle according to the methods described in Example 12. The results are shown in Tables I and II, below.

The test results indicate that fluorinated polyurethane coatings and liners of the present invention (prepared from Composition Nos. 2–4, 6–8, and 10–24), are similar to non-fluorinated polyurethane coatings (prepared from Composition Nos. 1, 5 and 9), with respect to transparency and optical clarity (i.e., percent light transmittance (%LT) and %haze (%HZ)) and mechanical strength. The results also demonstrate that surface properties of the invention fluorinated polyurethane coatings and liners were significantly altered, as indicated by the relatively higher water contact angles exhibited by the invention fluorinated coatings, as compared to the non-fluorinated polyurethane reference coatings. Higher water contact angles are associated with both enhanced water repellency and enhanced stain resistance. They are also indicative of a fluorine-rich surface.

In addition to the tests described above, the chemical resistance of coatings prepared from Composition Nos. 1 (non-fluorinated composition) and 3 (a fluorinated polyurethane composition of the present invention) was compared. Coated (and cured) samples were exposed to 75% sulfuric acid for 10 minutes. After exposure, the samples were washed with water and dried. The samples were evaluated for percent haze according to ASTM D-1003. The results indicated that the haze of the non-fluorinated polyurethane coating (prepared from Composition No. 1) had increased by 15% due to chemical attack. In contrast, the haze of the fluorinated polyurethane coating prepared in accordance with the present invention (i.e., prepared from Composition No.3) showed no change in haze. Accordingly, fluorinated polyurethane coatings of the present invention exhibit marked enhancement in chemical resistance as compared to non-fluorinated polyurethane coatings.

Fluorinated polyurethane coatings of the present invention were also evaluated for degree of weather resistance, as compared to non-fluorinated coatings. Coatings prepared from Composition Nos. 1 and 5 (non-fluorinated) and Composition Nos. 2 and 6 (fluorinated polyurethane compositions of the present invention) were exposed in a QUV-B 313 (Q-Panel Co., Cleveland, Ohio.) accelerated weathering chamber for 1000 hours per ASTM D-4329. After exposure, the percent haze of each sample was characterized as described above. The haze values of the non-fluorinated polyurethane coatings prepared from Composition Nos. 1 and 5 were 4.1% and 18.6%, respectively. In contrast, the haze values for the fluorinated polyurethane coatings of the present invention prepared from Composition Nos. 2 and 6, were significantly lower at 0.9% and 1.2%, respectively. These results indicate that fluorinated polyurethane coatings of the present invention are highly weather-resistant, as compared to non-fluorinated polyurethane coatings.

A study was also conducted to determine the effect of increasing the degree of fluorination in coatings of the present invention. As shown in Tables I and II below, increasing the fluorine content to 47.84% in Composition No. 21 (fluorinated polyurethane coating prepared in accordance with the present invention) did not adversely affect the transparency or optical clarity (% Light Transmittance) or hardness of the invention coating.

Chemical resistance of the invention coatings is further enhanced by higher fluorine levels. Coatings prepared from Composition No. 9 (non-fluorinated) and Composition No. 21 were conditioned at 120° F./100% relative humidity for 2 days. A drop of 75% sulfuric acid was applied to each coating and allowed to stand under vacuum for 16 hours. The coatings were then exposed to −40° F. for 8 hours, warmed to room temperature, then washed with cold water. Visual examination of the two coatings indicated that the coating prepared from Composition No.1 had a white, opaque spot on the exposed area, whereas the coating prepared from Composition No. 21 was unaffected. Accordingly, these results demonstrate that fluorine content of the invention fluorinated polyurethane coatings can be widely varied without affecting optical clarity or environmental resistance.

TABLE I

Properties of Polyurethane Coatings (Examples 1–10)

| Composition No. | % F | MW (branch-point) (g/mole) | % LT | % Hz | Contact Angle (°) |
|---|---|---|---|---|---|
| 1 | 0 | 1266 | 92.2 | 1.1 | 76 |
| 2 | 0.60 | 1316 | 91.8 | 1 | 86 |
| 3 | 1.7 | 1320 | 91.3 | 2 | 99 |
| 4 | 3.4 | 1394 | 92.4 | 1.3 | 93 |
| 5 | 0 | 1329 | 92.7 | 1.1 | 75 |
| 6 | 1.70 | 1387 | 92.8 | 1.5 | 105 |
| 7 | 2.22 | 622 | 92.5 | 2.3 | 105 |
| 8 | 2.22 | 1869 | 93.6 | 3.9 | 108 |
| 9 | 0 | 1233 | 91 | 0.5 | 91 |
| 10 | 1.50 | 1284 | 89 | 3.4 | 106 |
| 11 | 2.79 | 1333 | 85.8 | 7.8 | 113 |
| 12 | 4.20 | 1387 | 78.7 | 16.9 | 107 |
| 13 | 5.40 | 1439 | 64.7 | 33.3 | 113 |
| 14 | 0.63 | 1869 | 93.2 | 2.7 | 102 |
| 15 | 0.94 | 1869 | 92.2 | 4.2 | 105 |
| 16 | 1.25 | 1869 | 91.6 | 6.1 | 104 |
| 17 | 1.57 | 1869 | 93.3 | 9.7 | 112 |
| 18 | 0.70 | 1294 | 90.9 | 1 | 82 |
| 19 | 2.1 | 1332 | 89.2 | 1.2 | 87 |
| 20 | 3.71 | 1376 | 89.2 | 30.7 | 88 |
| 21 | 47.84 | 7060 | 94.6 | 0.5 | 105 |
| 22 | 46.16 | 4487 | 95.1 | 1.4 | — |
| 23 | 46.89 | 5000 | 93.5 | 1.8 | 106 |
| 24 | 47.98 | 6042 | 93.8 | 1.7 | — |
| 25 | 49.06 | 7598 | 94.6 | 0.5 | 105 |

(— not measured)

TABLE II

Properties of Polyurethane Coating (Examples 1–10)

| Composition No. | Tg (° C.) | Hardness (Shore) | Tensile Strength (psi) | Elongation (%) | Tear Strength (piw) |
|---|---|---|---|---|---|
| 1 | 14 | 55D | 5361 | 158 | 844 |
| 2 | 13 | 60D | 5074 | 132 | 884 |
| 3 | 12 | 55D | 5307 | 184 | 653 |
| 4 | 24 | 60D | 4794 | 164 | 874 |
| 5 | 34 | 75D | 5611 | 182 | 1620 |
| 6 | 21 | 75D | 5551 | 170 | 1567 |
| 7 | — | 98A | 5910 | 146 | — |
| 8 | — | 85A | 4436 | 250 | — |
| 9 | — | 95A | — | — | 239 |
| 10 | — | 95A | — | — | 313 |
| 11 | — | 97A | — | — | 356 |
| 12 | — | 98A | — | — | 456 |
| 13 | — | 99A | — | — | 483 |
| 14 | — | — | — | — | — |
| 15 | — | — | — | — | — |
| 16 | — | — | — | — | — |
| 17 | — | 95A | — | — | — |
| 18 | — | 55D | 5258 | 160 | 710 |
| 19 | — | 55D | 5032 | 160 | 682 |
| 20 | — | — | 4319 | 216 | 533 |
| 21 | — | 64D | 3967 | 246 | — |
| 22 | 28 | — | 4093 | 229 | — |
| 23 | 24 | 99A | GOOD | — | — |
| 24 | 17 | — | 3528 | 266 | — |
| 25 | — | 64D | 3967 | 246 | — |

(— not measured)

That which is claimed is:

1. A composition comprising:
   (A) an aliphatic polyisocyanate;
   (B) a non-fluorinated polyol; and
   (C) a saturated, iodine-free, aliphatic, fluorinated hydroxy-functional compound and selected from the group consisting of a primary fluorinated alcohol, a fluorinated polyol containing at least one primary alcohol group, and mixtures thereof,
   wherein said aliphatic fluorinated polyol is selected from the group consisting of a fluoroalkane polyol, a fluoroether polyol, a fluoro-sulfonamide polyol and combinations of any two or more thereof,
   wherein said fluoroether polyol is selected from the group consisting of polyols having the formulas:

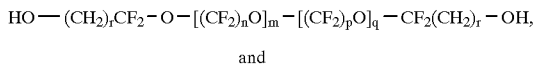

and

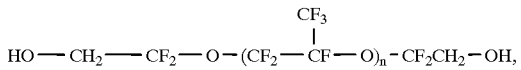

wherein r is an integer selected from 1 or 2, wherein n, m, p, and q are selected such that the molecular weight of compounds embraced by said formulas is between about 500 and about 5,000 g/mole, and wherein m/q is at least about 0.9;

wherein said composition is either solventless or substantially solventless;

and wherein upon application to a substrate and subsequent curing, said composition forms a weather-resistant, transparent, crosslinked, fluorinated polyurethane coating or liner having a glass transition temperature of at least about −30° C.

2. The composition according to claim 1, wherein said aliphatic fluorinated hydroxy-functional compound has a molecular weight in the range of about 100 to about 20,000 g/mole.

3. The composition according to claim 2, wherein said aliphatic fluorinated hydroxy-functional compound has a molecular weight in the range of about 150 to about 10,000 g/mole.

4. The composition according to claim 3, wherein said aliphatic fluorinated hydroxy-functional compound has a molecular weight in the range of about 300 to about 5,000 g/mole.

5. The composition according to claim 1, wherein said fluorinated alcohol is selected from the group consisting of a fluoroalkane alcohol, a fluoroether alcohol, a fluoro-sulfonamide alcohol, and combinations of any two or more thereof.

6. The composition according to claim 5, wherein said fluoroalkane alcohol has the formula,

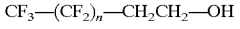

wherein n is a number in the range of about 1 to about 10.

7. The composition according to claim 1, wherein said aliphatic fluorinated hydroxy-functional compound is a fluoroalkane alcohol having the formula,

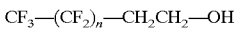

wherein n is a number in the range of about 3 to about 8.

8. The composition according to claim 5, wherein said fluoroether alcohol is selected from the group of compounds having the formulas:

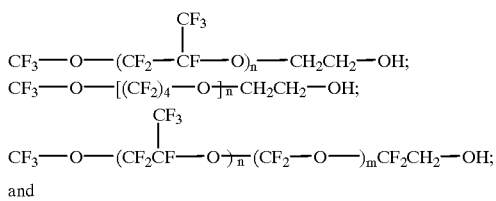

mixtures thereof,
wherein m and n are independently selected from numbers between about 1 and about 4.

9. The composition according to claim 1, wherein said aliphatic fluorinated hydroxy-functional compound is a fluoroether alcohol having the formula

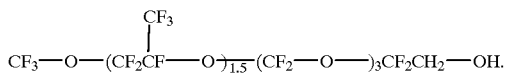

10. The composition according to claim 5, wherein said fluoro-sulfonamide alcohol has the formula,

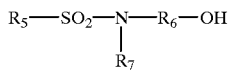

wherein $R_5$ is selected from a fluorinated, or partially fluorinated, optionally substituted, branched or straight chain, alkyl, alkenyl or alkynyl radical having from about 1 to about 20 carbon atoms in the backbone, $R_6$ is selected from an optionally fluorinated, optionally substituted, branched or straight chain, alkyl, alkenyl or atoms in the backbone, and $R_7$ is selected from a hydrogen atom, an optionally fluorinated, optionally substituted, branched or straight chain, alkyl, alkenyl or alkynyl radical having from about 1 to about 20 carbon atoms in the backbone.

11. The composition according to claim 1, wherein said aliphatic fluorinated hydroxy-functional compound is a fluoro-sulfonamide alcohol having the formula

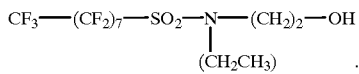

12. The composition according to claim 1, wherein said fluoroalkane polyol is selected from the group consisting of compounds having the formulas:

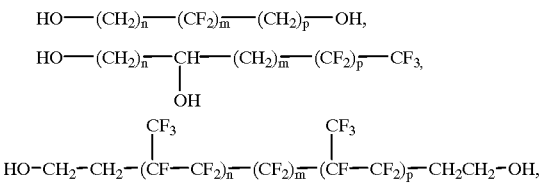

and mixtures thereof,
wherein n, m, and p are selected such that the molecular weight of compounds embraced by said formulas is between about 100 and about 2,000 g/mole.

13. The composition according to claim 1, wherein said aliphatic fluorinated hydroxy-functional compound is a fluoroalkane polyol selected from the group consisting of compounds having the formulas, $HO-CH_2-(CF_2)_4-CH_2-OH$, $HO-CH_2-(CF_2)_3-CH_2-OH$, $HO-CH_2-(CF_2)_2-CH_2-OH$, $HO-CH_2CH(OH)-CF_2-(CF_2)_5CF_3$ (i.e., 3-perfluorohexyl)-propane-1,2-diol), and $HO-CH_2CH_2-(CF_2)_5-CF(CF_3)-CH_2-CH_2-OH$.

14. The composition according to claim 1, wherein said aliphatic fluorinated hydroxy-functional compound is a perfluoroether polyol having the formula

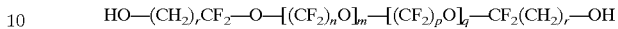

wherein r is 1 or 2, and n, m, p, and q are selected such that the molecular weight of said formulas is between about 500 and about 5,000 g/mole, and wherein m/q is at least about 1.0.

15. The composition according to claim 1, wherein said aliphatic fluorinated hydroxy-functional compound is a fluoroether polyol having the formula,

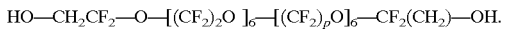

16. The composition according to claim 1, wherein the quantity of fluorinated hydroxy-functional compound(s) employed in said composition is between about 1 and about 85% by weight, based on total composition weight.

17. The composition according to claim 16, wherein the quantity of fluorinated hydroxy-functional compound(s) employed in said composition is between about 3 and about 70% by weight, based on total composition weight.

18. The composition according to claim 17, wherein the quantity of fluorinated hydroxy-functional compound(s) employed in said composition is between about 3 and about 60% by weight, based on total composition weight.

19. The composition according to claim 1, wherein said aliphatic polyisocyanate is selected from the group consisting of 4,4'-methylene-bis-(cyclohexyl isocyanate), 1,4-cyclohexane diisocyanate, 1,3-cyclohexane diisocyanate, 1,4-butane diisocyanate, 1,6-hexane diisocyanate, 1,10-decane diisocyanate, 2,2,4-trimethyl-1,6-hexane diisocyanate, bis- (3-methyl-4-isocyanatocyclohexyl) methane, 2,2-bis-(4-isocyanatocyclohexyl)propane, 3-isocyanato-methyl-3,5,5-trimethylcyclohexylisocyanate, 4,4'-dicyclohexyl diisocyanate, 2,4'-dicyclohexyl diisocyanate, and combinations of any two or more thereof.

20. The composition according to claim 1, wherein the ratio of —NCO— groups to —OH groups in said composition is between about 1.5:1 and about 1:1.

21. The composition according to claim 20, wherein the ratio of —NCO— groups to —OH groups in said composition is between about 1.1:1 and about 1:1.

22. The composition according to claim 1, wherein the quantity of aliphatic polyisocyanate in said composition is in the range of about 10 and about 60 percent by weight, based on total composition weight.

23. The composition according to claim 22, wherein the quantity of aliphatic polyisocyanate in said composition is in the range of about 25 and about 50 percent by weight, based on total composition weight.

24. The composition according to claim 23, wherein the quantity of aliphatic polyisocyanate in said composition is in the range of about 35 to about 40 percent by weight, based on total composition weight.

25. The composition according to claim 1, wherein said non-fluorinated polyol is selected from the group consisting of a monomeric polyol, a polymeric polyol, and mixtures thereof.

26. The composition according to claim 25, wherein said monomeric polyol is selected from the group consisting of ethylene glycol, 1,3-propanediol, 1,4-butanediol, 1,5-pentanediol, 1,6-hexanediol, 1,12-decanediol, 2,2-dimethyl-propane-1,3-diol, 1,4-cyclohexane-dimethylol, trimethylolpropane, and combinations of any two or more thereof.

27. The composition according to claim 25, wherein said non-fluorinated polyol is selected from the group consisting of polyether polyols, polyester polyols, polycarbonate polyols, and combinations of any two or more thereof.

28. The composition according to claim 1, wherein said non-fluorinated polyol is trimethylolpropane.

29. The composition according to claim 1, wherein said non-fluorinated polyol has a molecular weight in the range of about 300 to about 5,000 g/mole.

30. The composition according to claim 29, wherein said non-fluorinated polyol has a molecular weight in the range of about 500 to about 2,000 g/mole.

31. The composition according to claim 1, wherein the quantity of said non-fluorinated polyol in said composition is between about 1 to about 90 percent by weight, based on total composition weight.

32. The composition according to claim 31, wherein the quantity of said non-fluorinated polyol in said composition is between about 2 to about 80 percent by weight, based on total composition weight.

33. The composition according to claim 32, wherein the quantity of said non-fluorinated polyol in said composition is between about 2 and about 70 percent by weight, based on total composition weight.

34. The composition according to claim 1, further comprising a curing catalyst.

35. The composition according to claim 1, wherein said aliphatic polyisocyanate and said non-fluorinated polyol are prepolymerized.

36. The composition according to claim 1, wherein said aliphatic polyisocyanate and said aliphatic fluorinated hydroxy-functional compound are prepolymerized.

37. The composition according to claim 1, wherein said transparent, crosslinked, fluorinated polyurethane coating has a glass transition temperature of at least about 0° C.

38. The composition according to claim 1, wherein said transparent, crosslinked, fluorinated polyurethane coating has a glass transition temperature of at least about 10° C.

39. The composition according to claim 1, wherein said transparent, crosslinked, fluorinated polyurethane coating has a molecular weight between branch points of between about 200 and about 10,000 g/mole.

40. The composition according to claim 39, wherein said transparent, crosslinked, fluorinated polyurethane coating has a molecular weight between branch points between about 500 and about 5,000 g/mole.

41. The composition according to claim 39, wherein said transparent, crosslinked, fluorinated polyurethane coating has a molecular weight between branch points between about 500 and about 3,000 g/mole.

42. The composition according to claim 1, wherein said transparent, crosslinked, fluorinated polyurethane coating or liner exhibits a degree of fluorination of less than about 80% by weight.

43. The composition according to claim 42, wherein said transparent, crosslinked, fluorinated polyurethane coating or liner exhibits a degree of fluorination between about 0.1 and about 70% by weight.

44. The composition according to claim 1, wherein said transparent, crosslinked, fluorinated polyurethane coating or liner exhibits a degree of fluorination between about 0.1 and about 60% by weight.

45. The composition according to claim 1, wherein said transparent, crosslinked, fluorinated polyurethane coating or liner exhibit a percent light transmittance of at least about 80% LT.

46. The composition according to claim 45, wherein said transparent, crosslinked, fluorinated polyurethane coating or liner exhibits a percent light transmittance of at least about 85% LT.

47. The composition according to claim 46, wherein said transparent, crosslinked, fluorinated polyurethane coating or liner exhibits a percent light transmittance of at least about 90% LT.

48. The composition according to claim 1, wherein said transparent, crosslinked, fluorinated polyurethane coating or liner exhibits a tensile strength of at least about 1000 psi and a tensile elongation of at least about 50%.

49. The composition according to claim 48, wherein said transparent, crosslinked, fluorinated polyurethane coating or liner exhibits a tensile strength of at least about 2000 psi.

50. The composition according to claim 49, wherein said transparent, crosslinked, fluorinated polyurethane coating or liner exhibits a tensile strength of at least about 3000 psi.

51. The composition according to claim 1, wherein said transparent, crosslinked, fluorinated polyurethane coating exhibits a hardness of at least about Shore D30 as measured by ASTM D2240.

52. The composition according to claim 51, wherein said hardness is in the range of about Shore D50 to about Shore D100.

53. A method for coating a solid substrate comprising:
  (i) preparing a coated substrate by contacting at least one surface of a solid substrate with the coating composition of claim 1;
  (ii) subjecting said coated substrate to curing conditions such that said coating composition forms a transparent, crosslinked, fluorinated polyurethane coating having a glass transition temperature of at least about 0° C.

54. The method according to claim 53, wherein said curing conditions comprises heating said coated substrate to a temperature in the range of about 50° C. to about 110° C., for a period of about 2 to about 48 hours.

55. An article comprising a solid substrate having a transparent, crosslinked, fluorinated polyurethane coating or liner thereon, prepared in accordance with the method of claim 53.

* * * * *